United States Patent [19]

Lesourd

[11] Patent Number: 5,482,346

[45] Date of Patent: Jan. 9, 1996

[54] FOLD-AWAY AUXILIARY SEAT UNIT FOR A VEHICLE

[75] Inventor: Bruno Lesourd, Chatillon Coligny, France

[73] Assignee: Cesa-Compagnie Europeene de Sieges Pour Automobiles, Levallois-Perret Cedex, France

[21] Appl. No.: 328,002

[22] Filed: Oct. 24, 1994

[30] Foreign Application Priority Data

Oct. 26, 1993 [FR] France .................................. 93 12760

[51] Int. Cl.⁶ ..................................................... B60N 2/36
[52] U.S. Cl. .................. 296/66; 296/75; 297/15
[58] Field of Search .............................. 296/63, 65.1, 66, 296/75; 297/15, 320

[56] References Cited

U.S. PATENT DOCUMENTS

| 1,609,605 | 8/1925 | Buck | 296/66 |
| 3,746,389 | 7/1973 | Fourrey | 297/15 |

FOREIGN PATENT DOCUMENTS

| 569847 | 6/1961 | Belgium | 296/65.1 |
| 1217149 | 5/1960 | France | 296/66 |
| 2079920 | 10/1971 | France . | |
| 2843667 | 4/1980 | Germany . | |
| 3719584 | 1/1988 | Germany . | |
| 3911264 | 10/1990 | Germany . | |
| 2110619 | 6/1983 | United Kingdom | 296/66 |
| 2268877 | 1/1994 | United Kingdom . | |

*Primary Examiner*—Dennis H. Pedder
*Attorney, Agent, or Firm*—Sughrue, Mion, Zinn, Macpeak & Seas

[57] ABSTRACT

The seat unit capable of being folded away in a floor (10) in which is provided a cavity closed by a movable cover, comprises in particular a seat proper (21) with a frame (201) which has lateral members (2111) and cross-bars (2112) and a backrest (22) with a frame (221) having lateral posts (2211) and cross-members (2212), and two lateral arms (23) each having a free end portion (231) adapted to rest on the bottom of the cavity, an anchored end portion (232) connected by a pivot (2320) to a lateral post of the backrest frame and an intermediate portion (233) connected by a pivot (2330) to a lateral member of the seat frame, an articulation (24) comprising a fixed part (241) and a movable part (242), and retaining means (252, 2511). Application in an automobile vehicle of the "estate car" type is disclosed.

15 Claims, 4 Drawing Sheets

FOLD-AWAY AUXILIARY SEAT UNIT FOR A VEHICLE

The present invention relates to a fold-away auxiliary seat unit for vehicles and in particular ground automobile vehicles.

As is conventional, ground automobile vehicles usually called "estate cars" generally comprise a platform which is longer than the platform of ground automobile vehicles commonly called "saloons" from which they are derived. This arrangement permits not only increasing the loading capacity of the vehicle, for example with luggage or other means, but also increasing, if need be, the number of seat units available for transporting passengers. Indeed, with vehicles called "estate cars", there is usually sufficient place for installing other seat units, for example arranged in a third row located behind the conventional row of rear seat units. This third row of seat units in this way permits accommodating adults of relatively small size or children. In this way a vehicle currently called "family car" is obtained.

However, the vehicles called "estate cars" and vehicles called "family cars" derived from a "saloon" vehicle are two well-distinct versions and the "family car" in particular has its load-carrying capacities reduced owing to the fact that its platform is encumbered by the seat units of the third row, especially when they are unoccupied, even if in this case it is possible to at least partly fold them in the manner of flap seat units or the like.

lit will therefore be understood that the existence of this third row of seat units presents a drawback, especially when they are unoccupied. A solution to this type of difficulty is disclosed in the document FR 1,552,894. In the solution of this document, the third row of seat units is carried by a removable frame of use in "estate cars" and the like. This accessory permits seating children and, when it is desired to withdraw it from the vehicle, it can be converted into a picnic table.

This solution is not suitable for all situations. In particular, this accessory is relatively cumbersome and takes up a considerable amount of space whether it concerns the space of the rear platform when it is left in the vehicle with its seat units unused or the space of a garage or a cellar when it is withdrawn from the vehicle and stored away. Further, this accessory gives rise to considerable difficulties when it is desired to satisfy safety standards as concerns beth its fixing to the floor of the platform and the anchoring of the safety belts with which vehicle seat units are normally equipped. Moreover, this solution provides spartan-like comfort.

An object of the invention is to overcore this type of difficulty by providing an improved auxiliary seat unit affording great comfort, adapted to equip a vehicle and capable of being folded away in its floor, even in the delicate situation in which a spare wheel is placed under the latter.

The invention provides an improved auxiliary seat unit for equipping a vehicle and capable of being folded away in the vehicle floor in which is provided a cavity having an opening, a bottom and lateral walls which together define an enclosure capable of housing the seat unit and closable by a movable cover when the seat unit is placed therein. Said seat unit, which comprises in particular a seat proper with a frame which has lateral members and outer and inner cross-bars and a backrest with a frame which has lateral pests and upper and lower cross-members, is characterized in that it comprises two lateral arms each of which has a free end portion adapted to rest on the bottom, an anchored end portion connected by a pivot to a lateral post of the backrest and an intermediate portion connected by a pivot to a lateral member of the seat, an articulation which defines a pivot axis for the seat and cover and which comprises a fixed part fixed to a lateral wall of the cavity in proximity to its opening and a movable part which carries the frame of the backrest and the cover, and retaining means cooperative in particular with the inner cross-bar of the frame of the seat for maintaining the seat in an unfolded position where it is capable of receiving an occupant after pivoting from the folded-away position in the cavity and out of the latter, said pivots being disposed in such manner that, when the seat passes from its unfolded position to its folded away position, the seat and the backrest are relatively offset in a direction orthogonal to the direction in which the pivot axis extends.

Owing to the adopted kinematics, it is possible to combine great comfort for the occupant when the seat is erected in its unfolded position and a minimum overall seat size when the seat is folded to the folded-away position.

Further features of the invention will be apparent from the following description and claims and from the accompanying drawing which is given solely by way of example and in which:

Figure 1:
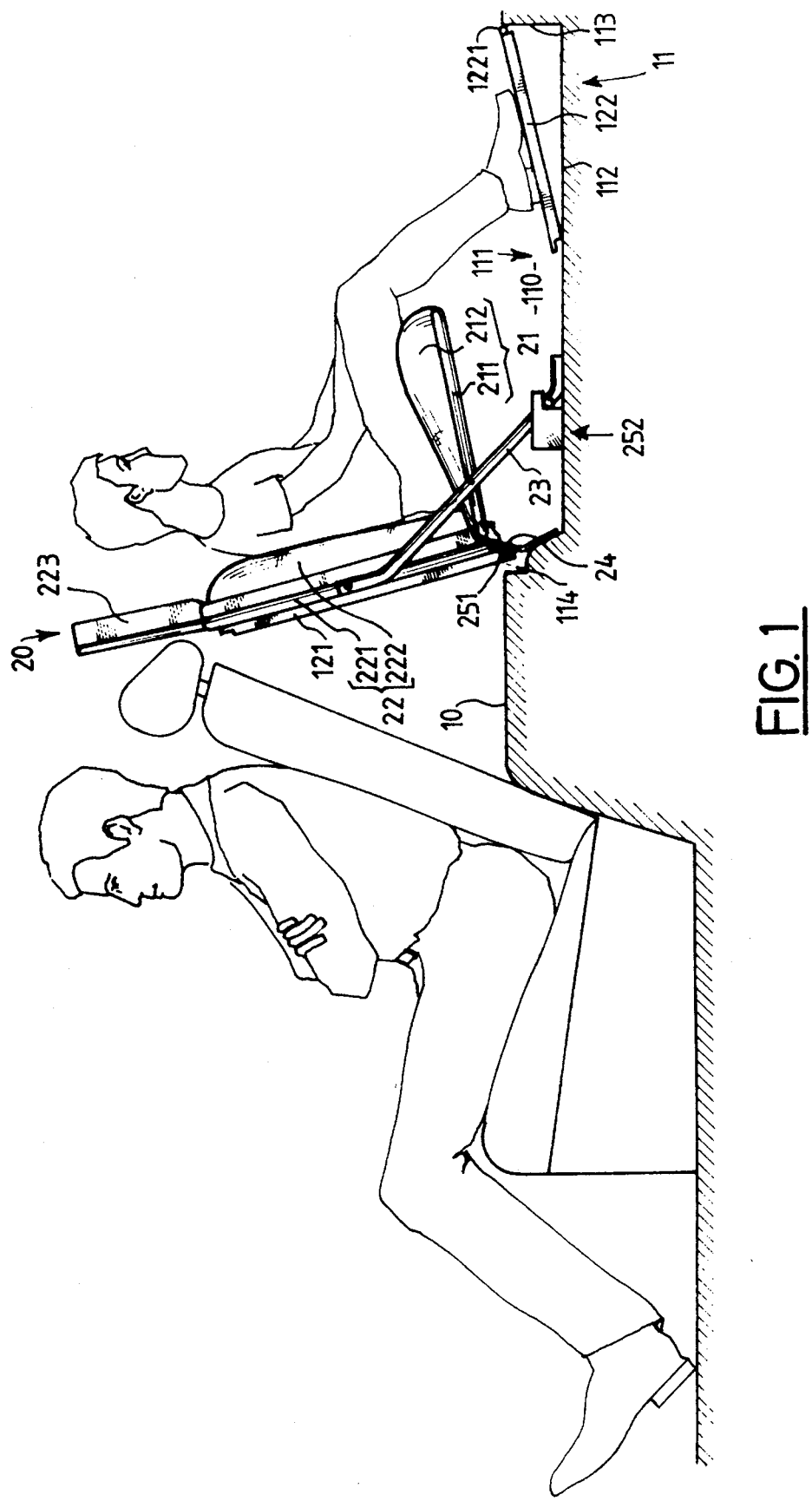
FIG. 1 is a diagrammatic partial elevational view of an embodiment of an auxiliary seat according to the invention in the unfolded position it occupies when a passenger is seated thereon.

As vehicles, in particular ground automobile vehicles, and foldable seat units are well known in the art, there will only be described hereinafter that which directly or indirectly concerns the invention. For the rest, one skilled in the considered art will derive inspiration from the current conventional solutions available for solving particular problems which may arise.

Hereinafter, the same reference numeral will always be employed for identifying a homologous element irrespective of the embodiment or its alternative arrangement.

For ease of description, there will be described in succession each of the components of an improved fold-away auxiliary seat unit according to the invention before giving an explanation, if need be, of the fabrication, the operation and the use thereof.

Hereinafter, a seat unit according to the invention will be described in its particular application to a vehicle called "estate car" of which only the seat unit of the rear row occupied by a passenger and the floor are diagrammatically represented. It must be clear that this specific application is not intended to be limitative and that a seat unit according to the invention may also be employed for other ground automobile vehicles, for example "coupes" or "convertibles".

As can be seen in the Figures of the drawing, a floor 10 of a vehicle is so shaped as to define a cavity 11, pit, box, container or the like. This cavity 11 has an opening 111, a bottom 112 and lateral walls 113 which together define an enclosure 110. If need be, for reasons which will become clear hereinafter, the opening 111 of the cavity 11 is bordered, at least partly, by a rabbet 14 or the like.

Figure 3:
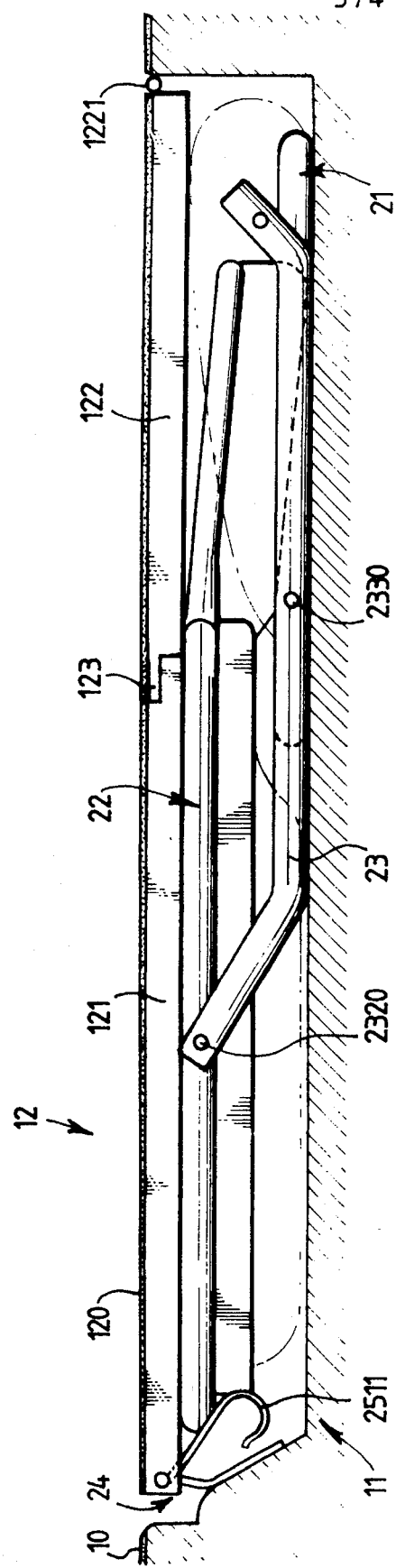
FIG. 3 is a diagrammatic partial elevational view, with parts in section, of the seat unit of FIGS. 1 and 2 in the folded-away position.

A cover 12 permits closing the opening 111 of the cavity 11 when a seat unit is placed therein. The cover 12 is adapted to lie in the extension of the floor and ensure its continuity when it is placed over the cavity for closing the latter. The surface of this cover which is visible when the cavity is closed carries if need be cladding 120 such as for example a pile carpet or a carpet of rubber or an elastomer, conventionally used for example in the luggage compartments of vehicles. Preferably, the cover 12 is made in two independent sections, one of these sections is formed by a large panel 121 and the other by a small panel 122 the specific functions of which will be explained hereinafter. It is sufficient for the moment to indicate that the small panel 122 is movable and mounted on the floor 10 in proximity to the opening 111 of the cavity by means of at leas t one hinge 1221 or the like. Consequently, the small panel 122 is capable of bearing in the cavity 11 in an inclined position as illustrated in FIG. 1 for reasons which will be understood hereinafter. The small panel 122 is also capable of being raised completely out of the cavity and, if need be, placed against the floor after having swung through a semi-rotation from the position in which it is illustrated in FIG. 3. One of the elements comprising the large panel 121 and the small panel 122 is preferably provided with a stop 123, such as tabs or L-section members, so as to be capable of immobilizing the small panel 122 in the extension of the large panel 121 when the latter partly closes the opening of the cavity as illustrated in FIG. 3. For this purpose, the large panel 121 then rests in the rabbet 114 as illustrated in FIG. 3.

A seat unit 20 is movable between a folded-away position in the cavity closed by the cover and an unfolded position outside the cavity where it is capable of receiving a passenger seated therein. The seat unit 20 comprises mainly a seat proper 21, a backrest 22, arms 23, an articulation 24 and stop 252.

The seat 21 comprises a frame 211 with lateral members 2111 and outer and inner bars 2112. This frame which is of any current conventional type, for example made from welded tubes, is adapted to receive a support element 212 on which will be seated an occupant who will place his backside and his thighs. This support element is made for example from a strip of cloth or a seat or the like with preferably lateral and transverse rolls of padding, upholstery or stuffing.

The backrest 22 is made from a frame 221 with lateral posts 2211 and upper and lower cross-members 2212. This frame is of any suitable known type, as mentioned with respect to the frame of the seat. This frame is adapted to receive a support element 222 of any current conventional type, as mentioned with respect to the support element of the cushion. The backrest 22 is preferably equipped with a headrest 223 and lateral rolls of padding, as illustrated.

Each of the two lateral arms 23 has a free end portion 231 adapted to rest on the bottom 112, an anchored end portion 232 connected by a pivot 2320 to a lateral post 2211 of the backrest 22, for example in proximity to the upper cross-member 2212, and an intermediate portion 233 connected by a pivot 2330 to a lateral member 2111 of the seat 21, for example in proximity to the inner bar 2112. All this is clearly shown in particular in FIG. 2 of the drawing. The pivots 2320 and 2330 are of any suitable type, for example formed by a bearing, or opening or the like in which is engaged a pin, stud or the like.

The articulation 24 of any suitable known type such as at least one hinge or the like, defines a pivot axis 240. This articulation 24 comprises two parts 241 and 242. The part 241 is fixed securely to the lateral wall 113 of the cavity 11 in proximity to its opening 111. This fixed part 241 is secured in any suitable conventional manner, for example by screwing as illustrated or riveting, welding, adhesion, etc. The movable part 242 is connected to the lower cross-member 2212 of the frame 221 of the backrest 22, as illustrated. The lower cross-member is fixed to the movable part in any suitable conventional manner, for example by screwing, riveting, welding, adhesion, etc. As can be seen, the large panel 121 of the cover is carried by the frame 221 of the backrest 22 on which it is maintained in any suitable manner, for example by screwing, adhesion or the like.

The retaining means comprise in particular a support 251 on the movable part 242 of the articulation. This support 2511 is adapted to cooperate with the seat and more particularly with the inner bar 2112 of the seat. This support 2511 is for example in the form of at least one hook, which is preferably resiliently yieldable and has a lyre shape with a tapering entrance for reasons which will be clear hereinafter. It should be noted that the hook is oriented or faces toward the pivot axis 240. This support is in one piece with the movable part, as illustrated, or mounted on the latter. The retaining means 25 further comprise preferably at least one stop 252 placed in the cavity 11 and adapted to cooperate with at least one free end portion 231 of an arm 23. This stop 252 comprises for example an L-shaped member 2521, fixed in the cavity 11 in any suitable manner, for example by screwing, welding or the like, and a stud 2522, lug or the like fixed in any suitable conventional manner to the free end portion 231 of the arm 23. All this is clearly shown in particular in FIG. 2 of the drawing. The L-section member 2521 is fixed to the bottom or to a lateral wall of the cavity 11 and disposed on the side of the arm from which the stud 2522 projects. The component parts of a fold-away auxiliary seat unit according to the invention are fabricated from current conventional materials, cut out, shaped and assembled in accordance with traditional techniques All the component parts are united, assembled and mounted as clearly shown in the Figures of the drawing.

The operation of a seat unit according to the invention will now be described.

Figure 2:
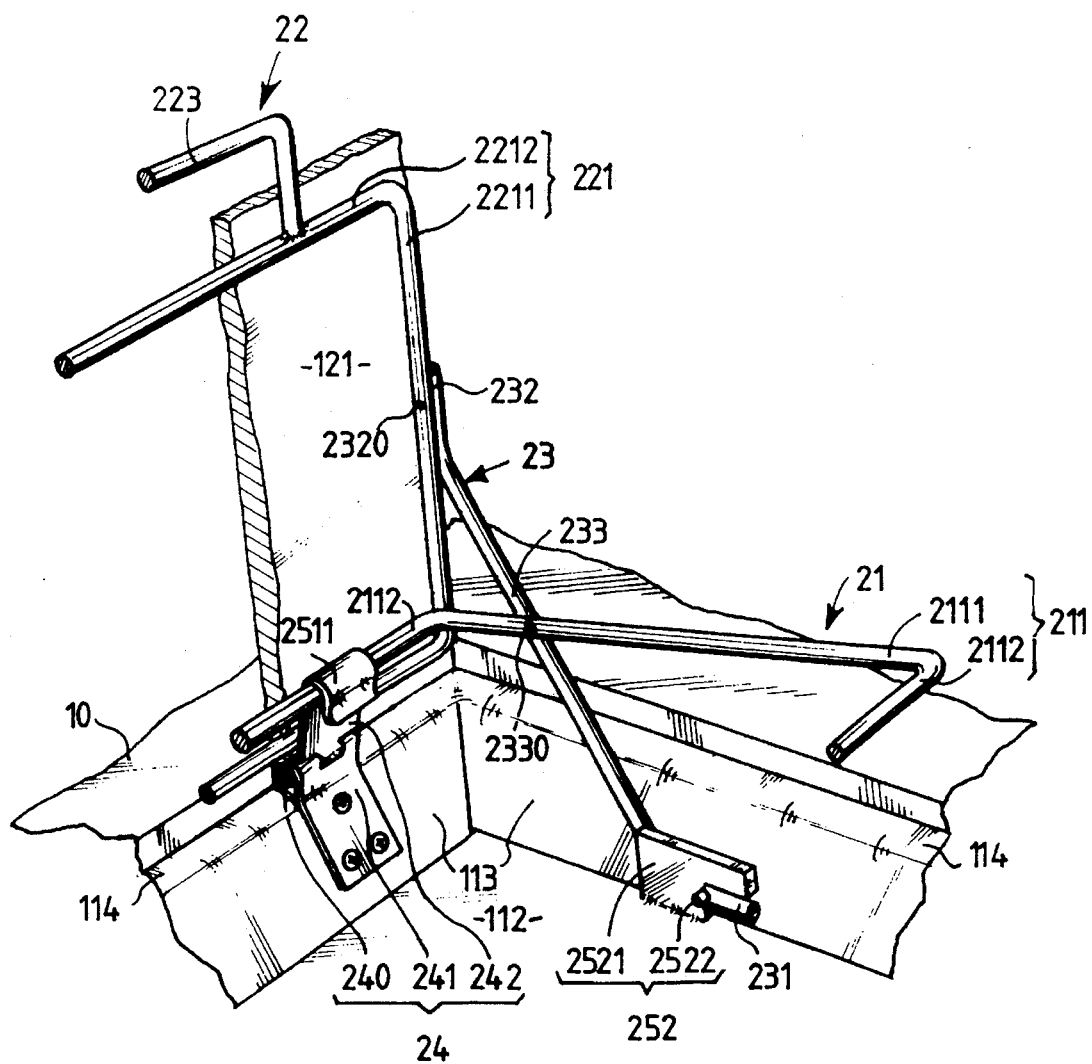
FIG. 2 is a diagrammatic partial perspective view of the embodiment of the seat unit of FIG. 1.

It will be assumed that the seat unit according to the invention initially occupies the unfolded position illustrated in FIGS. 1 and 2. It will be observed that, in this position, the inner cross-bar 2112 of the frame of the seat, namely that close to the backrest, is retained in at least one hook 2511 of the support of the retaining means and also that the free end portion 231 of each of the arms 23 bears in an unhindered manner on the bottom 112 of the cavity of the floor. It will also be observed that the chosen position of the pivot 2330 is such that, when a passenger normally occupies the seat unit according to the invention, his centre of gravity is located, relative to this pivot, adjacent to the outer cross-bar of the seat, i.e. that remote from the backrest, so that the weight of the occupant normally tends to cause the seat to tilt in the direction which favours and ensures the maintenance of the inner cross-bar in the hook. It will also be observed that the pivots 2320, 2330 and the inner cross-member 2112 of the seat unit in the unfolded position form a triangle which imparts to the seat unit a quasi-absolute rigidity. It will therefore be understood that, although the seat unit according to the invention is generally articulated in particular by the articulation 24, the mere bearing of the free end portion of the arms on the bottom of the cavity is sufficient to ensure its stability.

However, it will be observed that, if the occupant of the seat unit came to bear very strongly against the footrest constituted by the small panel 122 of the cover 12, as illustrated in FIG. 1, or if an impact from the front occurred with a large longitudinal component with respect to the vehicle, the seat unit would tend to tilt in the counterclockwise direction as viewed in FIGS. 1 and 2 of the drawing, about its articulation 24. This undesirable consequence is prevented by the presence of the stop 252 of which the L-section member 2521 is correctly oriented to counter such a harmful tilting.

If the occupant now leaves the seat unit according to the invention and it is desired to place the seat unit in its folded-away position in the cavity, the following procedure is adopted.

With the rear hatchback or the like of the vehicle (not shown) previously opened, the inclined small footrest panel on the bottom of the cavity is extracted and swung out of the latter, if need be by allowing it to rest or drop against the floor; the outer cross-bar of the seat can be taken hold of and raised in the counterclockwise direction as viewed in the Figures of the drawing. In doing so, the inner cross-bar is disengaged from the hooks of the retaining means. It is then sufficient to pull the seat proper of the seat unit toward oneself by pulling on the outer cross-bar. It will be observed that the triangle mentioned hereinbefore is thus "broken" and that it is now possible for the seat and the backrest of the seat unit to pivot relative to each other. The free end portion of the arms then slides along the bottom of the cavity in a direction away from the articulation in such manner that its stud is disengaged from the L-shaped member of the stop. The backrest together with the large panel of the cover fold to a horizontal position and the edges of the panel bear against the rabbet which is recessed relative to the level of the floor. It is then sufficient to terminate the operation by swinging over the footrest panel of the cover and causing it to bear against the abutments, and thereby reconstitute a substantially perfectly planar surface by means of the cover which lies in the extension of the rest of the floor of the vehicle, as illustrated in FIG. 3.

Figure 4:
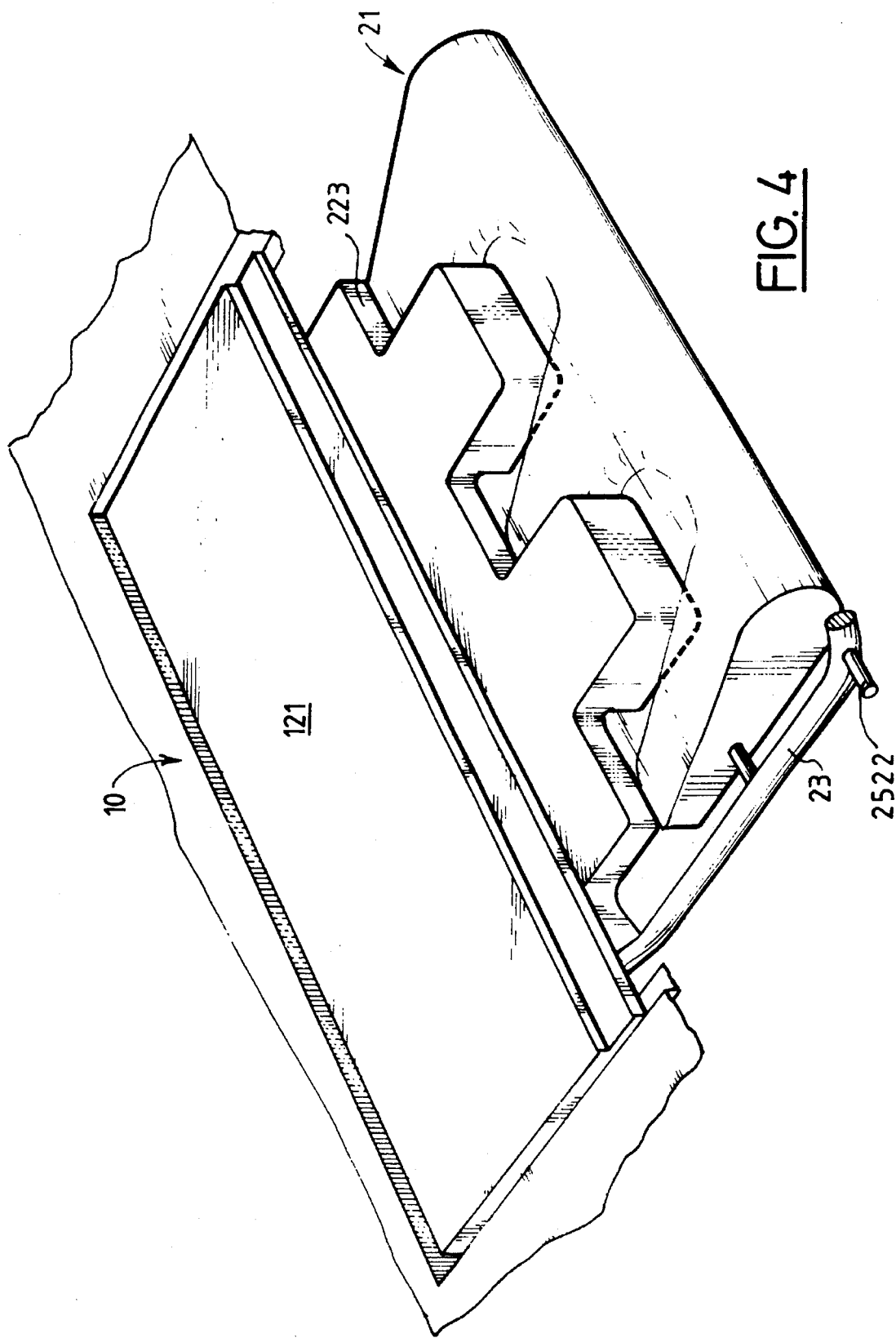
FIG. 4 is a diagrammatic perspective view of this embodiment of a seat unit according to the invention in the folded-away position showing the imbrication between the backrest and the seat which are relatively longitudinally offset.

It should be observed that when a seat unit according to the invention passes from its unfolded position illustrated in FIGS. 1 and 2 to its folded-away position illustrated in FIG. 3, the seat proper is displaced and comes to a position of proximity to the end of the cavity remote from that at which the articulation is located. This is of considerable interest since there is obtained in this way a "longitudinal" offset of the backrest relative to the seat proper. Notwithstanding the fact that the support elements of the backrest and seat are chosen to be as thin as possible so as to achieve a saving in "thickness" or in "height", this offset permits markedly improving the comfort afforded by the seat unit, since it results in a mutual avoidance between the lateral and transverse rolls of padding employed for providing a support, in particular a support for the lumbar region and the popliteal region. Owing to this longitudinal offset between the backrest and seat when the seat unit is in the folded-away position, the rolls of padding in question can take up and find their own particular place in the cavity without interfering. It will be observed in particular that, despite its length or normal height, the headrest can be housed without difficulty above the central region of the seat without abutting the lateral and transverse rolls of padding of the outer part of the seat. This is clearly illustrated in FIG. 4.

If it is now assumed that an improved seat unit according to the invention is initially in the folded-away position illustrated in FIG. 3 and that it is desired to place it in its unfolded position, it is sufficient to proceed in exactly the opposite order. The small footrest panel of the cover is first of all raised and a push is exerted on the outer cross-bar of the seat, if need be by facilitating the operation by slightly raising the backrest. The free end portion of the arms then slides in the direction toward the articulation and the stud carried by the free end portion of the arms takes up its position in the L-section member of the stop. It is then sufficient to lower the outer cross-bar of the seat and urge it into the lyre-shaped hook so as to overcome the resilient resistance of the latter. The seat unit is then immobilized and it is sufficient to pivot again the small footrest panel so that it takes up its inclined position resting on the bottom of the cavity.

The foregoing holds true for a seat unit having one or more places, whether or not this seat unit be divided into fractions which are partly or completely independent, for example of the conventional ⅓, ⅔ type of seat unit.

The embodiment of the improved seat unit according to the invention was described and illustrated with an orientation which is such that its occupant or occupants face toward the rear of the vehicle. It is clear that nothing opposes the orientation to be in the opposite direction and so that the occupants of such a seat unit according to the invention face toward the front end of the vehicle, or even toward the side of the vehicle, the two seat units then being oriented face to face or back to back with the pivot axis parallel to the longitudinal axis of the vehicle.

The foregoing shows that a seat unit according to the invention is constructed in a very rustic manner and employs very simple kinematics which however afford the seat unit an "autostability" owing to the judicious choice of the positions of the axes and pivots and the undeformable triangulation effect. This seat unit is of a relatively moderate price and yet affords an improved comfort owing to the possibility of having a backrest-headrest unit of substantially normal height and owing to the possibility of disposing maintenance rolls of padding on the support elements of the seat and backrest, this comfort being still further improved by the presence of a footrest.

Apart from the foregoing, the improved seat unit according to the invention takes up a very small amount of space in thickness or in the vertical direction when it is in the folded-away position, owing to the adopted kinematics which produce a large neutral offset of the seat proper and backrest in a direction orthogonal to the direction in which the pivot axis extends, allowing the seat and backrest rolls of padding to avoid interfering with each other and the headrests to find their position in the hollows of the seat. Further, this seat unit meets all safety standards.

The foregoing underlines the distinctive features of an improved seat unit according to the invention, the interest of the seat unit and the resulting advantages.

What is claimed is:

1. Improved auxiliary seat unit for combining with a vehicle comprising a floor defining a cavity which has an opening, a bottom and lateral walls which together define an enclosure for housing said seat unit in a folded away position thereof, a movable cover for closing said cavity when said seat unit is placed therein, said seat unit comprising in combination: a seat, a frame for said seat, which frame comprises lateral members and outer and inner cross-bars, and a backrest, a frame for said backrest, which backrest frame comprises lateral posts and upper and lower cross-members, said seat unit further comprising two lateral arms each having a free end portion adapted to bear on said bottom, an anchored end portion, a first pivot connecting said anchored end portion to a respective one of said lateral posts, an intermediate portion, a second pivot connecting said intermediate portion to a respective one of said lateral members of said seat frame, an articulation which defines a pivot axis for said seat unit and said cover and which comprises a fixed part connected to a respective one of said lateral walls of said cavity in proximity to said opening and a movable part which carries said frame of said backrest and said cover, and retaining means cooperative with said inner cross-bar of said seat frame for maintaining said seat unit in an unfolded position out of said cavity in which it is capable of receiving an occupant after pivoting from a folded away position in said cavity, said pivots being so disposed that when said seat unit passes from said unfolded position to said folded away position, said seat and said backrest are relatively offset in a direction orthogonal to a direction in which said pivot axis extends.

2. Seat unit according to claim 1, wherein said first pivot is placed in proximity to said upper cross-member and said second pivot is placed in proximity to said inner cross-bar.

3. Seat unit according to claim 1, wherein said retaining means comprise at least one hook-shaped support carried by said movable part of said articulation.

4. Seat unit according to claim 3, wherein said hook-shaped support is resiliently yieldable.

5. Seat unit according to claim 1, wherein said retaining means comprise at least one stop located in said cavity and cooperative with at least one of said free end portions of said arms.

6. Seat unit according to claim 5, wherein said stop comprises an L-shaped member fixed in said cavity and a stud fixed to said at least one free end portion.

7. Seat unit according to claim 1, wherein said cover is made in two independent sections.

8. Seat unit according to claim 7, wherein one of said sections of said cover is a first panel carried by said frame of said backrest and the other of said sections is a movable small second panel mounted on said floor in proximity to said opening of said cavity and remote from said articulation so as to be capable of entering said cavity.

9. Seat unit according to claim 1, wherein said opening of said cavity is at least partly bordered by a rabbet capable of receiving said cover which is adapted to rest locally therein when said seat unit is in said folded away position.

10. Seat unit according to claim 9, wherein one of said first panel and said second panel is provided with a stop for immobilizing the other of said first and second panels when said seat unit is in said folded away position.

11. Seat unit according to claim 9, wherein said second panel is mounted on said floor by means of at least one hinge and is capable of being supported in said cavity in an inclined position for the purpose of acting as a footrest.

12. Seat unit according to claim 1, wherein each of said frames carries a support element for receiving a body of an occupant.

13. Seat unit according to claim 12, wherein at least one of said support elements is provided with padding.

14. Seat unit according to claim 1, further comprising a headrest mounted on said backrest.

15. Seat unit according to claim 1, wherein said seat unit is oriented to face the rear of said vehicle.

* * * * *